United States Patent [19]
Authement, Sr.

[11] Patent Number: 5,009,284
[45] Date of Patent: Apr. 23, 1991

[54] CHAIR LIFT APPARATUS

[76] Inventor: Sherrill A. Authement, Sr., P.O. Box 77, Cameron, La. 70631

[21] Appl. No.: 550,057

[22] Filed: Jul. 9, 1990

[51] Int. Cl.⁵ .......................... A45F 3/26; A47C 9/10; A01M 31/02
[52] U.S. Cl. ................................... 182/142; 182/187; 182/129
[58] Field of Search ............... 182/142, 150, 187, 188, 182/134, 135, 136, 129

[56] References Cited

U.S. PATENT DOCUMENTS

| | | | |
|---|---|---|---|
| 4,347,913 | 9/1982 | Cromer | 182/142 |
| 4,347,914 | 9/1982 | Gary | 182/142 |
| 4,552,248 | 11/1985 | Payne | 182/142 |
| 4,593,789 | 6/1986 | Treants | 182/187 |
| 4,602,698 | 7/1986 | Grant | 182/187 |
| 4,623,036 | 11/1986 | Pondorf | 182/142 |
| 4,694,934 | 9/1987 | Erickson | 182/142 |
| 4,811,803 | 3/1989 | Green | 182/142 |
| 4,886,143 | 12/1989 | Dubroc | 182/142 |

Primary Examiner—Reinaldo P. Machado
Attorney, Agent, or Firm—Leon Gilden

[57] ABSTRACT

An apparatus is set fourth for providing a chair lift for vertical repositioning relative to an overlying support such as a tree or adjacent building. The apparatus includes a seat platform, including a lateral and longitudinal bar orthogonally and integrally mounted to the bottom surface of the seat platform. The lateral bar includes a plurility of arm rest posts integrally mounted thereto, with an arm rest mounted at an upper end of each post pivotally mounted to each arm rest post. The longitudinal bar includes a forward and rear "L" shaped yoke, wherein the forward yoke includes a light post mounted thereto. The rear "L" shaped yoke includes a lower spine link adjustably mounted thereto, with a back suport plate mounted to the lower spine link. An upper spine link is pivotally mounted relative to the lower spine link and in turn is pivotally mounted to an overhead link which integrally mounts a winch member to effect a lifting of the organization. Accessories for use in the organization include a selectively utilized fire arm support sheath, a food tray, and a paint tray.

6 Claims, 7 Drawing Sheets

PRIOR ART

CHAIR LIFT APPARATUS

BACKGROUND OF THE INVENTION

1. Field of the Invention

The field of invention relates to chair lift apparatus, and more particularly pertains to a new and improved chair lift apparatus wherein the same permits collapsing of the organization for transport during periods of non-use in a backpack arrangement.

2. Description of the Prior Art

Chair lift organizations have been utilized in the prior art, but have heretofore failed to provide the compact unitary organization as set forth by the instant invention. Examples of the prior art include U.S. Pat. No. 4,593,789 to Treants setting forth an organization utilizing a plurality of loop members mounted upon a framework to straddle an associated tree to permit vertical ascent relative to the tree utilizing a winch member.

U.S. Pat. No. 4,602,698 to Grant sets forth a hunting chair, wherein a winch is mounted to a vertical post and the vertical post is provided with a cable directed therethrough to permit an elevation of the chair into an associated tree.

U.S. Pat. No. 4,694,934 to Erickson sets forth an elevating structure wherein a loop member is mounted about an overlying support, such as a tree limb, and wherein the loop is directed through a cable to effect elevation of an associated structure relative to the tree.

U.S. Pat. No. 4,205,733 to Wade sets forth a portable station that may be arranged for mounting relative to an associated tree utilizing a platform and a plurality of stabilizing enables to arrange the platform relative to the tree structure.

U.S Pat. No. 4,552,248 to Payne sets forth a climbing device defined as a "C" shaped framework member, with a seat mounted within the framework and a leg peddle structure to effect extension or retraction of the cable associated with the organization to permit elevational ascent or descent relative to the tree.

As such, it may be appreciated that there continues to be a need for a new and improved chair lift apparatus wherein the same addresses both the problems of ease of use as well as effectiveness in construction in permitting relative ascent to a tree or support and permitting interfolding of the organization for transport during periods of non-use and in this respect, the present invention substantially fulfills this need.

SUMMARY OF THE INVENTION

In view of the foregoing disadvantages inherent in the known types of chair lift apparatus now present in the prior art, the present invention provides a chair lift apparatus wherein the same provides for a compact, portable organization easily interfolded for transport and extended for use relative to an associated tree or support structure. As such, the general purpose of the present invention, which will be described subsequently in greater detail, is to provide a new and improved chair lift apparatus which has all the advantages of the prior art chair lift apparatus and none of the disadvantages.

To attain this, the present invention provides an apparatus setting forth a chair lift for vertical repositioning relative to an overlying support such as a tree or adjacent building. The apparatus includes a seat platform, including a lateral and longitudinal bar orthogonally and integrally mounted to the bottom surface of the seat platform. The lateral bar includes a plurality of arm rest posts integrally mounted thereto, with an arm rest mounted at an upper end of each post pivotally mounted to each arm rest post. The longitudinal bar includes a forward and rear "L" shaped yoke, wherein the forward yoke includes a light post mounted thereto. The rear "L" shaped yoke includes a lower spiner link adjustably mounted thereto, with a back support plate mounted to the lower spine link. An upper spine link is pivotally mounted relative to the lower spine link and in turn is pivotally mounted to an overhead link which integrally mounts a winch member to effect a lifting of the organization. Accessories for use in the organization include a selectively utilized firearm support sheath, a food tray, a tool tray, and a paint tray.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art Who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved chair lift apparatus which has all the advantages of the prior art chair lift apparatus and none of the disadvantages.

It is another object of the present invention to provide a new and improved chair lift apparatus which may be easily and efficiently manufactured and marketed.

It is a further object of the present invention to provide a new and improved chair lift apparatus which is of a durable and reliable construction.

An even further object of the present invention is to provide a neW and improved chair lift apparatus which is susceptible of a low cost of manufacture with regard to both materials and labor, and which accordingly is then susceptible of low prices of sale to the consuming public, thereby making such chair lift apparatus economically available to the buying public.

Still yet another object of the present invention is to provide a new and improved chair lift apparatus which provides in the apparatuses and methods of the prior art some of the advantages thereof, while simultaneously overcoming some of the disadvantages normally associated therewith.

Still another object of the present invention is to provide a new and improved chair lift apparatus wherein the same provides for an apparatus readily inter-folded for storage or manual transport and easily extended into a locked position to permit ascent relative to an associated tree structure.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
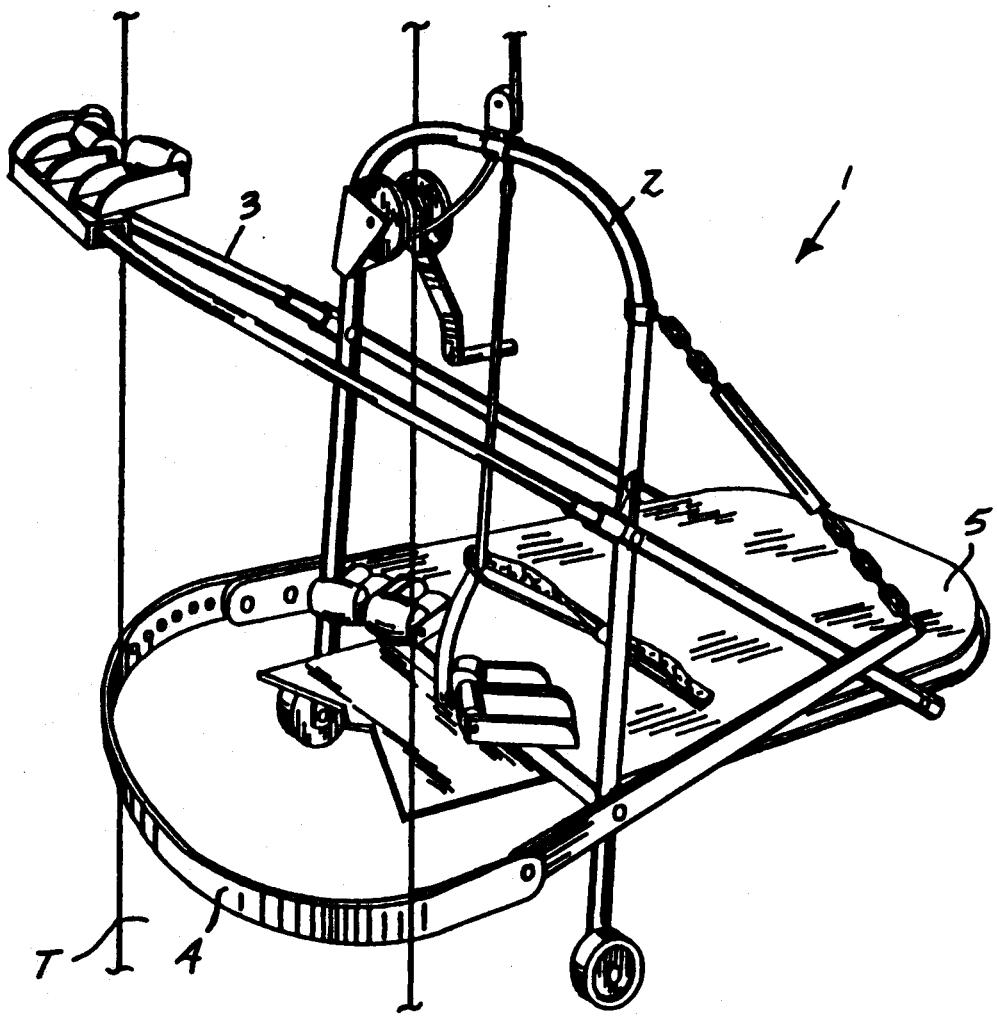
FIG. 1 is an isometric illustration of a prior art organization relative to an associated tree.

With reference now to the drawings, and in particular to FIGS. 1 to 12 thereof, a new and improved chair lift apparatus embodying the principles and concepts of the present invention and generally designated by the reference numeral 10 will be described.

Figure 2:
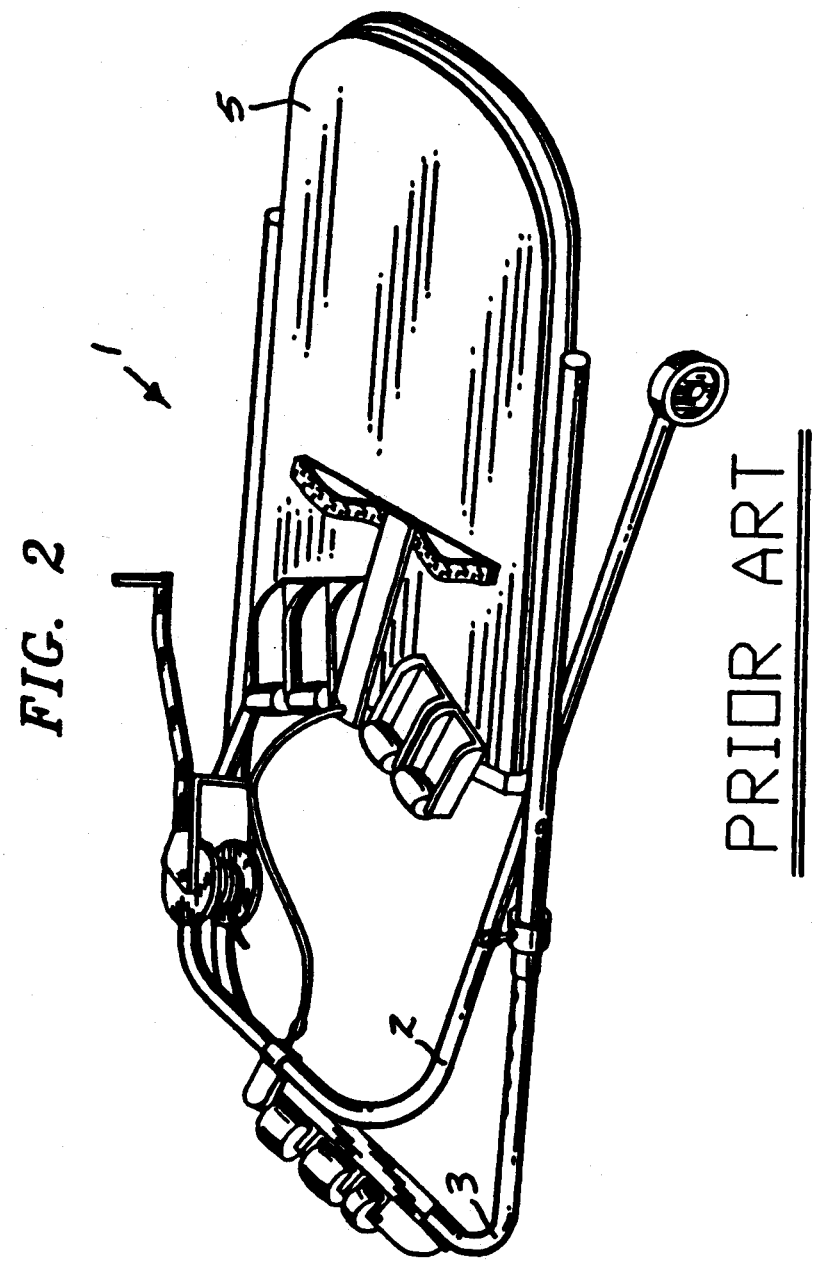
FIG. 2 is an isometric illustration of the prior art structure in an relationship.

FIG. 1 illustrates a prior art chair lift apparatus 1 utilizing a vertical "U" shaped framework member 2 pivotally mounted to a further "U" shaped framework member 3 mounting a plurality of rollers for engagement with an associated tree surface "T", wherein a lowermost yoke 4 surrounds the tree "T" below the frame portion 3, wherein the frame portions are all secured to a platform 5. FIG. 2 illustrates the organization in a collapsed orientation.

Figure 6:
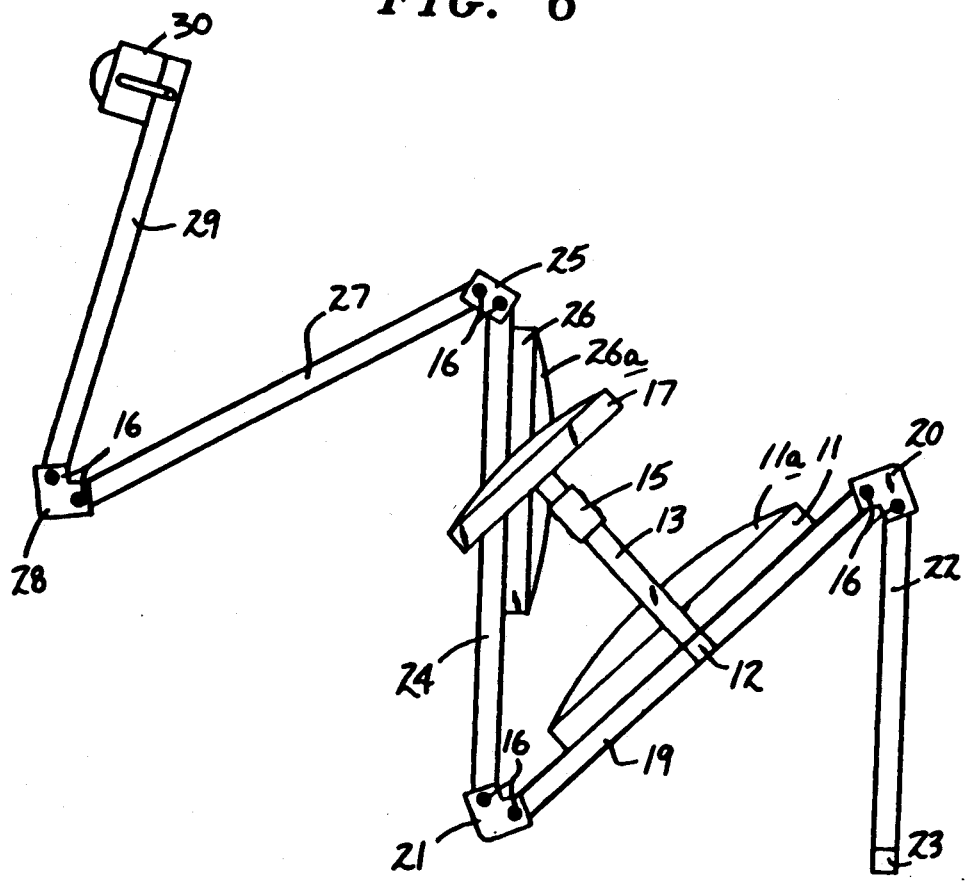
FIG. 6 is an orthographic side view of the apparatus in a partially folded relationship.
Figure 7:
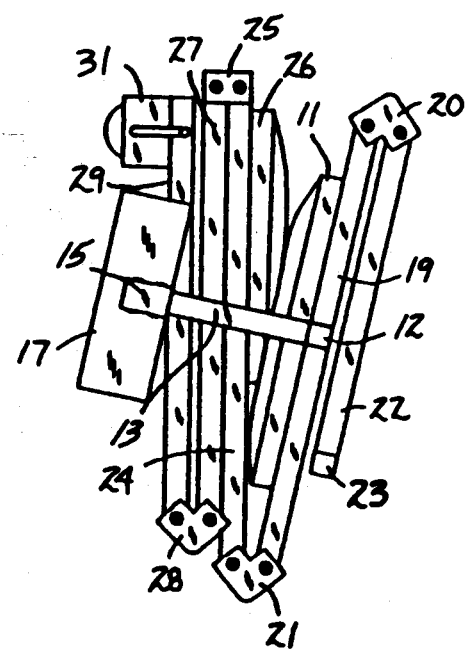
FIG. 7 is an orthographic side view of the apparatus in an inter-folded configuration.

More specifically, the chair lift apparatus 10 of the instant invention essentially comprises a seat platform 11 including a planar bottom surface and an arcuate top surface, wherein the arcuate top surface may include padding 11a, in a manner as illustrated in FIG. 6 for example. The bottom surface of the seat platform includes a lateral seat support bar 12 fixedly mounted to the bottom surface of the seat platform extending beyond opposed sides of the platform. A longitudinal seat support bar 19 is fixedly mounted to the bottom surface of the seat platform 11 and is arranged orthogonally relative to the lateral seat support bar 12 and extends forwardly and rearwardly of the seat platform 11. A right arm rest 13 and a left arm rest 14 are integrally and orthogonally mounted to opposed terminal ends of the lateral seat support bar 12, and each include a "C" shaped yoke 15 mounted at upper terminal ends of each arm post. Each "C" shaped yoke mounts a respective right and left arm rest 17 and 18 to the respective right and left arm posts 13 and 14, including removable pins 16 to permit pivotment of their respective right and left arm rests 17 and 18 to overlie the seat 11 for inter-folding of the organization, in a manner as illustrated in FIG. 7 for example.

Figure 3:
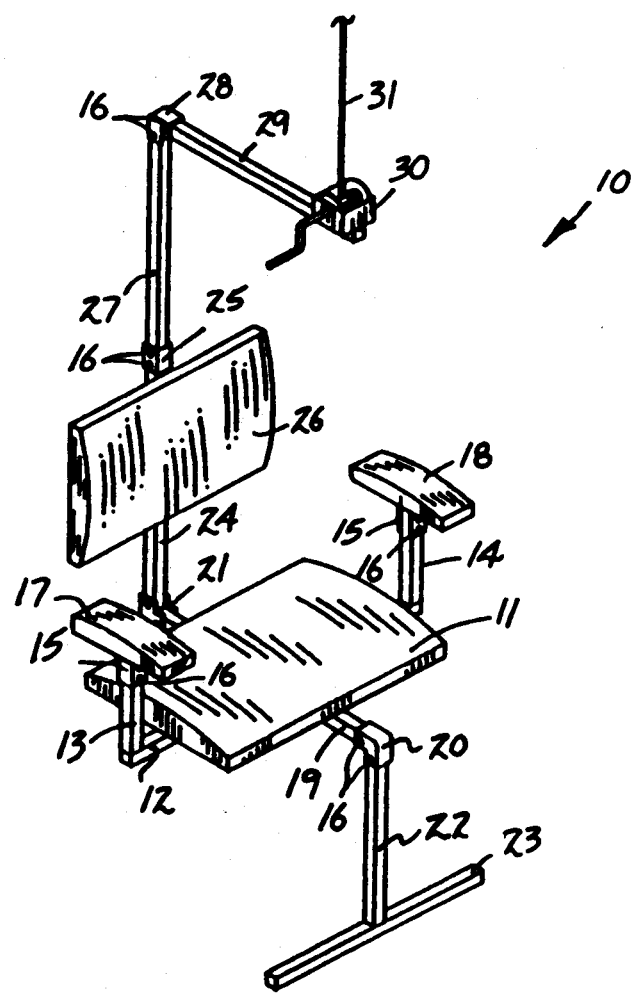
FIG. 3 is an isometric illustration of the instant invention.
Figure 4:
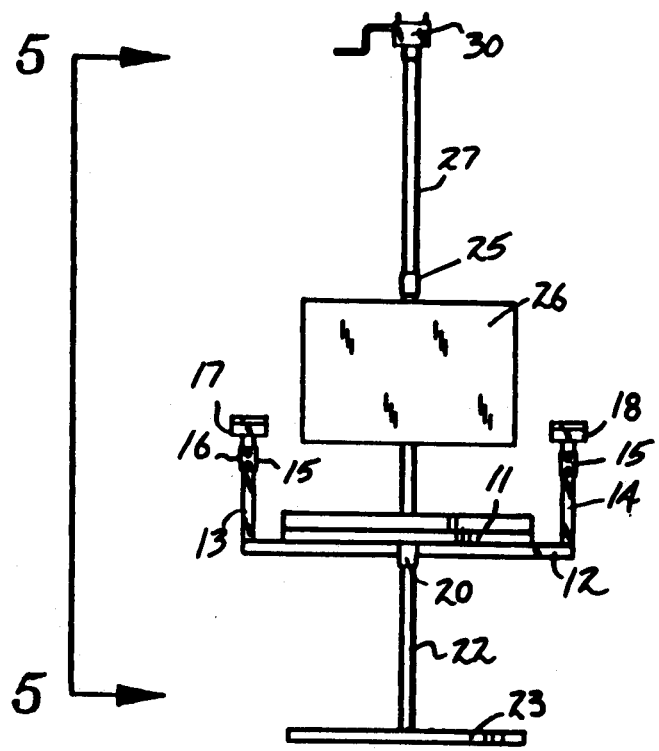
FIG. 4 is an orthographic front view, taken in elevation, of the instant invention.
Figure 5:
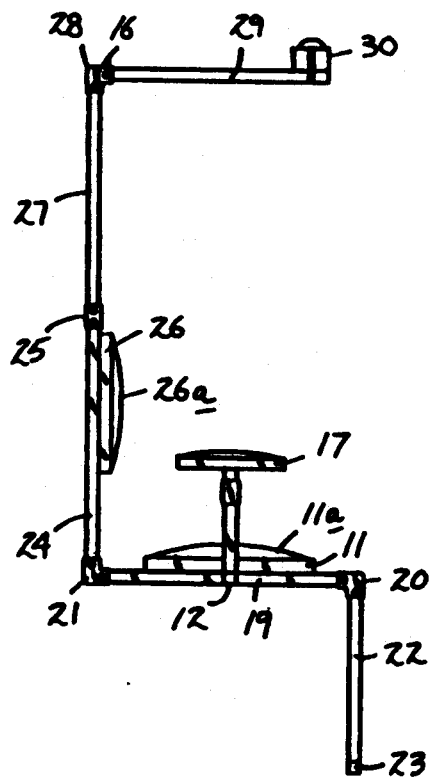
FIG. 5 an orthographic view, taken along the lines 5—5 of FIG. 4, in the direction indicated by the arrows.

The longitudinal seat support bar 19 includes a forward "L" shaped yoke 20 and a rear "L" shaped yoke 21, each also including removable pins 16, with the forward yoke 20 mounting a forward leg post 22 in an orthogonal first position, as illustrated in FIG. 3, with a forward leg post support bar 23 integrally and orthogonally mounted at a lower terminal end of the forward leg post 22, with the forward leg post 22 bisecting the support bar 23. Further it should be noted, if desired, the forward leg post 22 may be telescopingly arranged relative to the longitudinal seat support bar 19 (not shown) to accommodate various leg lengths of an individual.

The rear "L" shaped yoke 21 mounts a lower spine link 24 in an orthogonal orientation relative to the longitudinal seat support bar 19, with the lower spine link 24 arranged parallel to the forward leg post 22, but extending upwardly relative to the longitudinal seat support bar 19, as opposed to a downward orientation of the forward leg post 22. The lower spine link 24 includes a "C" shaped spine link yoke 25 mounted at an upper terminal end thereof to pivotally mount an upper spine link 27 from a first aligned orientation to a second overfolded orientation upon removal of the removable pin 16, in a manner as illustrated in FIG. 7. The lower spine link 24 mounts a back support plate 26 orthogonally thereto in an orthogonal orientation to the seat platform 11 in the first position of the organization, as opposed to the second position to inter-fold the organization, in a manner as illustrated in FIG. 7. The upper spine link 27 includes an upper spine "L" shaped support yoke 28 to orthogonally orient an overhead link 29 relative to the upper spine link 27, with the overhead link 29 arranged generally parallel to the longitudinal seat support bar 19 when the organization is in a first position, as illustrated in FIG. 3. A winch 30, including a crank handle, is mounted to a forward terminal end of the overhead link 29 to permit extension or retraction of a winch cable 31 for effecting elevational repositioning of the apparatus relative to a tree and the like for use. Further, it should be understood that the organization may be mounted to any structurally available component relative to a building or dwelling or the like to permit selective use of the organization in elevational repositioning of the apparatus relative to the aforenoted dwelling.

Figure 9:
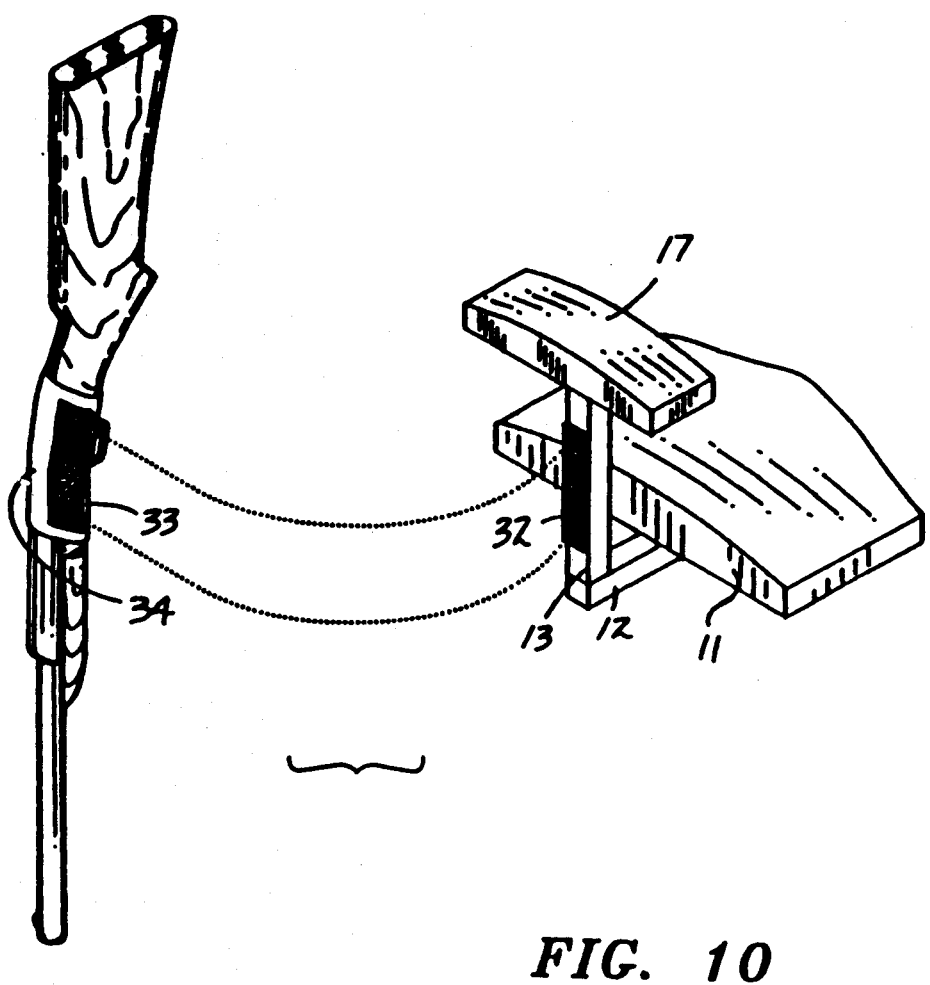
FIG. 9 is an isometric illustration of an auxiliary fire arm utilized by the instant invention.

FIG. 9 illustrates the use of the apparatus incorporating a first hook and loop fastener strip 32 mounted to an exterior surface of the right arm post 13 cooperative with a second hook and loop fastener strip 33 mounted to an exterior surface of an elongate fire arm sheath 34 to secure an associated fire arm therewithin to selectively secure the fire arm relative to the right arm post 13.

Figure 10:
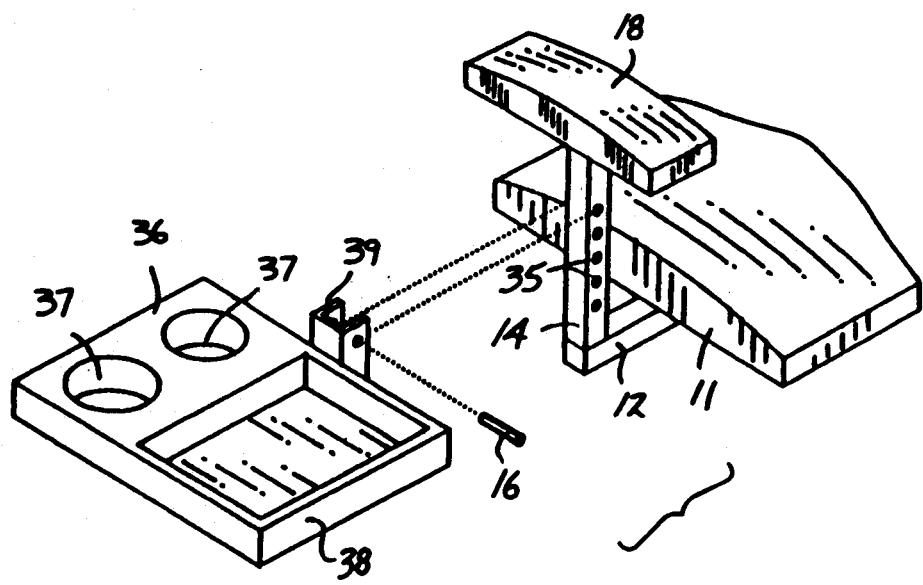
FIG. 10 is an isometric illustration of an auxiliary food tray utilized by the instant invention.
Figure 11:
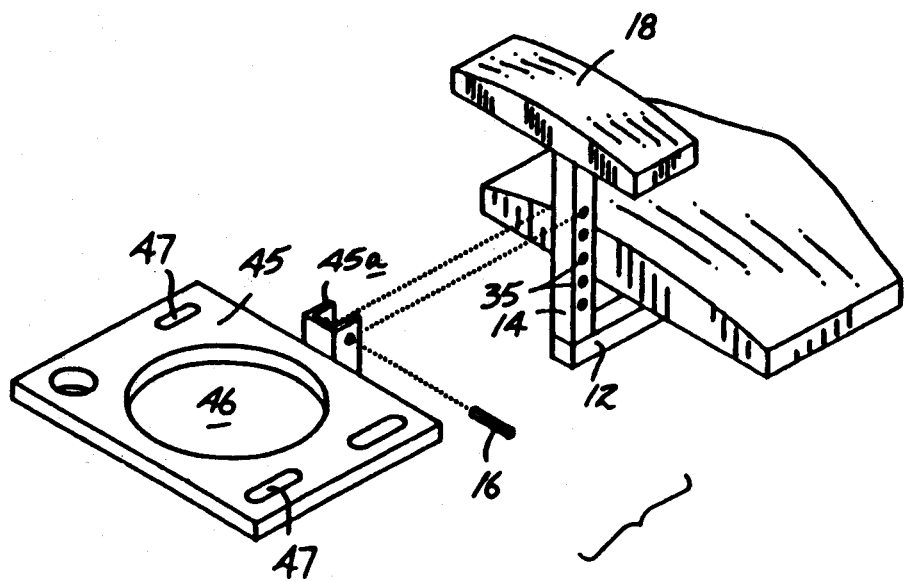
FIG. 11 is an isometric illustration of an auxiliary paint support tray utilized by the instant invention.
Figure 12:
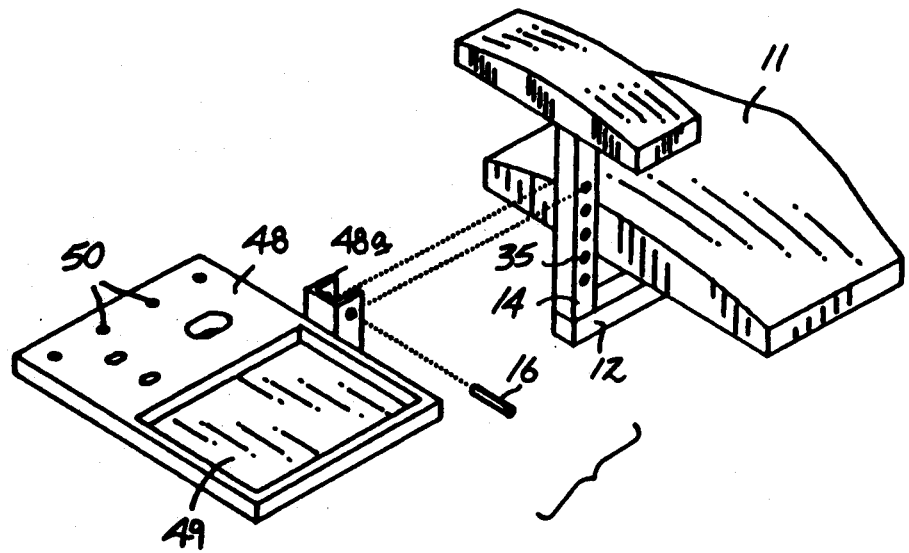
FIG. 12 is an isometric illustration of an auxiliary tool support utilized by the instant invention.

FIG. 10 illustrates the use of the left arm post 35 mounting a food tray 36, wherein the food tray includes a polarity of cylindrical cavities 37 to receive beverage components therewithin, and a central cavity 38 that is recessed below a top surface of the food tray 36. The food tray 36 includes a "C" shaped food tray yoke 39, including spaced apertures to receive a removable pin to selectively secure the tray to associated left arm post apertures 35 mounted through the left arm post 14. The left arm post apertures 35 may further selectively mount a paint tray 45, as illustrated in FIG. 11, wherein the paint tray 45 includes a "C" shaped yoke 45a and the associated removable pin structure 16 to secure the paint tray 45 to the left arm post 14. The paint tray 45 includes a central paint can support cavity 46 to receive a paint can thereto, with paint brush slots 47 directed through the paint tray to secure paint brushes therewithin. Further, a tool tray 48 may be selectively utilized, including a central tool tray recess cavity 49, with a tool tray yoke 48a of a "C" shaped configuration selectively mounted to the right arm post 14 by use of the removable pin structure 16 directed through aligned apertures within the tool tray yoke 48a and the left arm post apertures 35. Various tool tray apertures 50, as well as the tool tray recess cavity 49, permit active securement of tools within the tool tray cavity.

Figure 8:
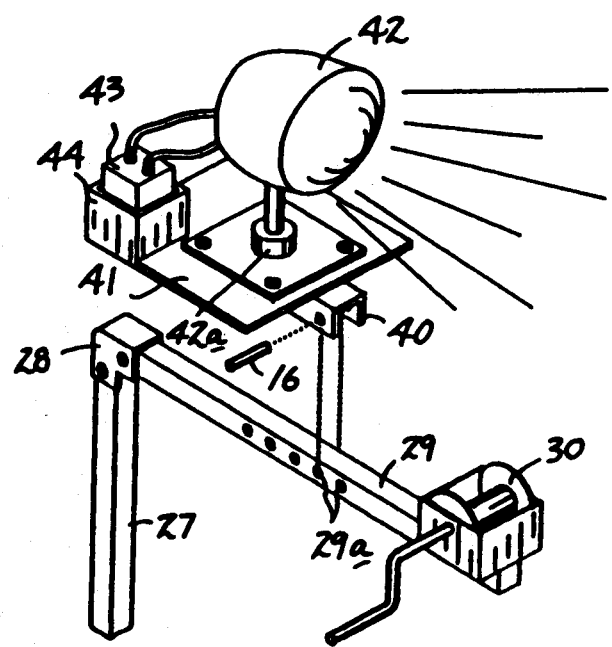
FIG. 8 is an isometric illustration of an auxiliary spot light utilized by the instant invention.

FIG. 8 illustrates the use of a spotlight member 42 that is mounted to mounting plate 41. The mounting plate 41 includes a "C" shaped overhead yoke 40, including aligned apertures orthogonally directed to the legs of the "C" shaped yoke 40 to receive a removable pin 16 for securement to overhead link apertures 29a. The mounting plate 41 includes the spotlight 42 mounted thereon, as well as a battery storage housing 44 mounting a battery 43 for use with the organization. The spotlight 42 is mounted to a cylindrical post to permit rotation of the spotlight, as well as removal of the spotlight relative to a cylindrical support 42a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A chair lift apparatus comprising, in combination,
a seat platform, the seat platform including a bottom surface and a top surface, the bottom surface including a lateral seat support bar extending beyond opposed sides of the seat platform,
and
a longitudinal seat support bar orthogonally oriented relative to the lateral seat support bar mounted to the bottom surface, wherein the lateral and longitudinal so at support bars are integrally mounted to the bottom surface of the seat platform,
and
a right arm post integrally and orthogonally mounted to a right terminal end of the lateral seat support bar, and a left arm post integrally and orthogonally mounted to a left terminal end of the lateral seat support bar, wherein the right and left arm posts are arranged parallel relative to one another,
and
a right arm rest platform mounted to an upper terminal end of the right arm post, and a left arm rest platform mounted to an upper terminal end of the left arm post, wherein the right and left arm rest platforms are pivotally mounted to the respective right and left arm posts,
and
the longitudinal seat support bar including a forward "L" shaped yoke mounted at a forward terminal end of the longitudinal seat support bar,
and
a rear "L" shaped yoke mounted to a rear terminal end of the longitudinal seat support bar,
and
a forward leg post mounted to the forward "L" shaped yoke and orthogonally oriented relative to the longitudinal seat support bar in a first position and arranged to overlie in inter-folded relationship the longitudinal seat support bar in a second position, wherein the forward "L" shaped yoke permits selective pivotment of the forward leg post relative to the longitudinal seat support bar,
and
a forward leg post support bar integrally and orthogonally mounted to the forward leg post,
and
a lower spine link mounted to the rear "L" shaped yoke, wherein the rear "L" shaped yoke permits pivotment of the lower spine link from a first position orthogonally oriented relative to the longitudinal seat support bar to a second position to overlie the upper surface of the seat platform in a second position of the lower spine link,
and
a back support plate mounted integrally and orthogonally to a forward surface of the lower spine link,
and
an upper spine link including an upper spine link lower yoke pivotally mounting the upper spine link relative to the lower spine link from a longitudinally aligned first position of the upper spine link to the lower spine link to an overlying orientation of the upper spine link relative to the lower spine link in an upper spine link second position,
and an upper spine link "L" shaped yoke orthogonally mounting an overhead link in a first position, wherein the overhead link is arranged parallel to the longitudinal seat support bar in the first position, and a winch mounted to a forward terminal end of the overhead link, wherein the winch includes an elongate cable mounted thereto for securement to a structural support member permitting elevational repositioning of the apparatus upon selective extension or retraction of the cable.

2. An apparatus as set forth in claim 1 wherein the upper surface of the seat platform includes an arcuate padding mounted integrally thereon, and the back support plate includes a convex outer surface padding integrally mounted to a forward surface of the back support plate.

3. An apparatus as set forth in claim 2 wherein the overhead link includes a series of overhead link apertures directed therethrough, and a "C" shaped overhead yoke includes a removable pin structure to selectively secure the "C" shaped overhead yoke to the overhead link, and the "C" shaped overhead yoke includes a platform integrally mounted to a top surface of the "C" shaped overhead yoke, and an illumination member selectively securable to the mounting plate, wherein the mounting plate includes a cylindrical support to selectively secure the illumination member therewithin, and a battery storage housing fixedly secured to the mounting plate, wherein the battery storage housing includes a battery in electrical association with the illumination member.

4. An apparatus as set forth in claim 3 wherein the left arm post includes a first hook and loop fastener strip mounted to an exterior surface thereof, and a firearm sheath including a second hook and loop fastener strip selectively securable to the first hook and loop fastener strip, wherein the firearm sheath selectively secures a firearm therewithin to permit selective securement of the firearm relative to the left arm post.

5. An apparatus as set forth in claim 4 wherein the right arm post includes a series of aligned right arm post apertures directed therethrough, and a "C" shaped yoke including aligned "C" shaped yoke apertures directed therethrough, wherein the "C" shaped yoke is selectively securable to the right arm post by selective securement of a pin to secure the "C" shaped yoke to the right arm post, and the "C" shaped yoke including a tray mounted integrally thereto, and the tray including a plurality of recesses to secure components therewithin.

6. An apparatus as set forth in claim 5 including a further tray selectively securable to the right arm post, wherein the further tray includes a further tray "C" shaped yoke and wherein the further "C" shaped yoke includes a plurality of further apertures for securement to the right arm post, and the further "C" shaped yoke includes a planar paint tray integrally and orthogonally mounted to the further "C" shaped yoke, the planar paint tray including a central through-extending opening directed therethrough for securement of a paint can, and further including a plurality of through-extending slots to receive paint brushes therewithin. planar plant tray including a central through-extending opening directed therethrough for securement of a paint can, and further including a plurality of through-extending slots to receive paint brushes therewithin.

* * * * *